April 23, 1935.  O. RASMUSSEN  1,998,735
STEERING POST BEARING
Filed Nov. 22, 1933
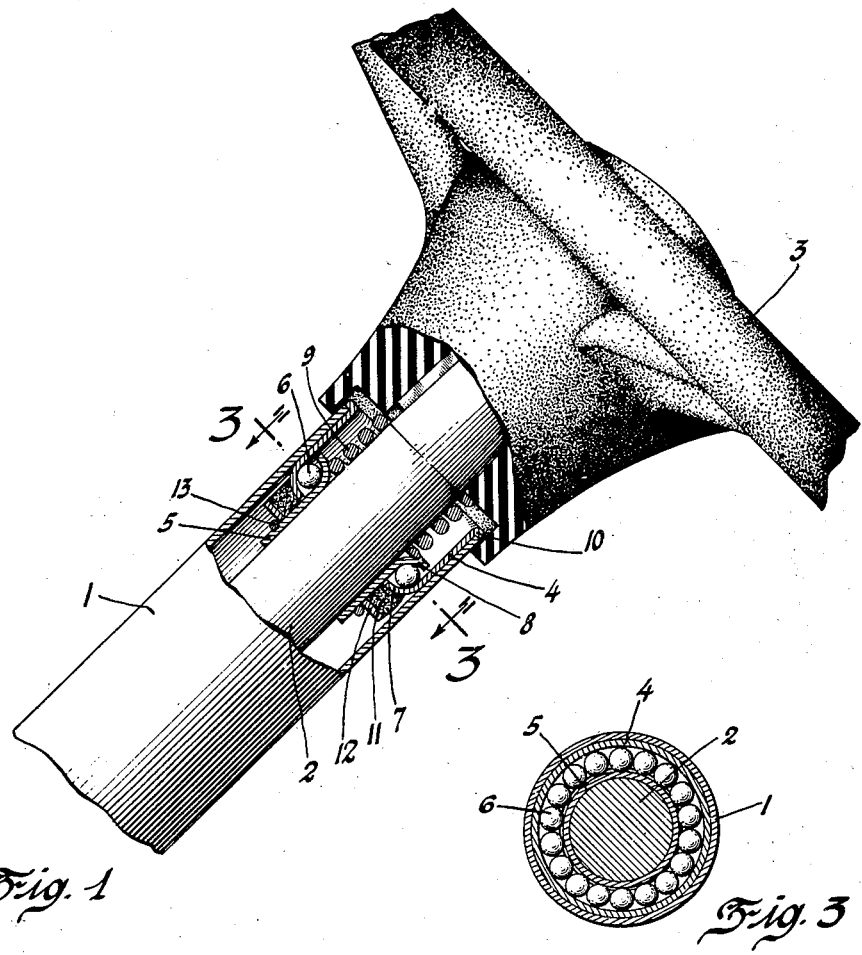
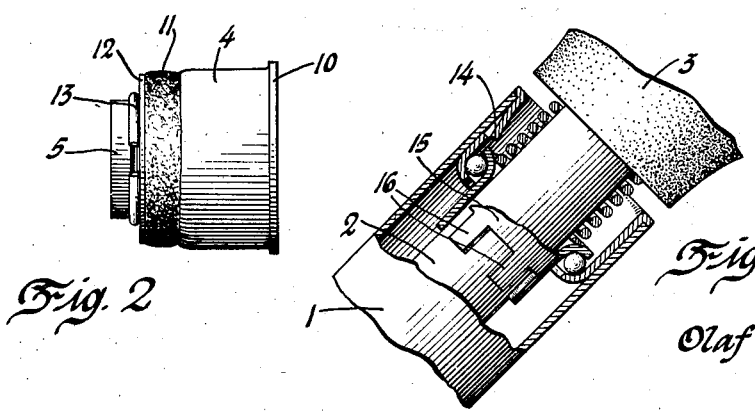
Fig. 1  Fig. 3  Fig. 2  Fig. 4
Inventor
Olaf Rasmussen
By Blackmore, Spencer & Flint
Attorneys Patented Apr. 23, 1935

1,998,735

UNITED STATES PATENT OFFICE 1,998,735

STEERING POST BEARING

Olaf Rasmussen, Saginaw, Mich., assignor to General Motors Corporation, Detroit, Mich., a corporation of Delaware Application November 22, 1933, Serial No. 699,156

6 Claims. (Cl. 308—184)

This invention relates to steering apparatus for motor vehicles, and more particularly to an improved bearing adapted for use in the upper end of the steering column.

In the conventional steering mechanism a long shaft enclosed within a stationary housing transmits movement from a hand wheel at the upper end to intermeshing gears at the lower end, the whole assembly being mounted on the vehicle through the gear housing at the bottom. Because of the long leverage, there is considerable stress imposed upon the shaft bearing at the steering wheel end, and difficulty has been experienced in getting a bearing to stand up for an appreciable length of time. Ordinary plain bearings, such as oilless bushings and rubber backed oil impregnated fabric bearings, after short usage, either bind through swelling, or loosen and wear and then rattles are heard and felt in the steering wheel. The problem presented, therefore, is to provide a bearing that will be free running with or without lubricant and be proof against rattle.

A bearing suitable for the purpose, and which is of simple and economic design, is shown in the accompanying drawing, wherein Figure 1 is a fragmentary side elevation of the upper end of the steering column, with parts shown in section; Figure 2 is a side elevation of the bearing assembly; Figure 3 is a sectional view taken on line 3—3 of Figure 1, and Figure 4 is a sectional view of a modification.

Referring to the drawing, the numeral 1 indicates a rigid tubular housing enclosing a steering shaft 2, on which is mounted the steering wheel shaft 3. The bearing between the housing 1 and shaft 2 includes a pair of telescopic sleeves 4 and 5, between which is interposed a series of spherical or ball bearings 6. At the lower end of the outer sleeve 4 is an inturned flange or projection 7 on one side of the anti-friction bearings and on the other side of the bearings is an outturned flange 8 on the upper end of the inner sleeve 5. Both flanges 7 and 8 are flared or curved on a radius slightly greater than the radius of curvature of the balls and provide wedging or camming surfaces for engagement with the bearings to take up wear automatically under the influence of a coil spring 9 which preloads the balls by being interposed between the flange 8 and the steering wheel 3 fixed on the shaft 2.

The outer sleeve 4 is held against axial movement by having a press fit in the housing 1 and additionally by being provided with an outturned flange 10 at its upper end to seat against the end of the tube wall. The inner sleeve 5 has a close slip fit on the shaft 2, to permit relative axial movement under the force of the spring 9. By this arrangement of parts, frictional resistance to relative movement of the steering shaft is reduced and yet looseness of parts, even through wear, is eliminated and there is provided a bearing unit which is simple and inexpensive in design.

To lubricate the bearing surfaces it is proposed to pack the parts in grease at the time of assembly, and to prevent loss of the lubricant, use may be made of a ring 11 of suitable packing material, held in engagement with the outer surface of the flange 7, by means of a backing washer 12 fixed on the lower end of the inner sleeve by means of a snap ring 13 fitted into an annular groove in the sleeve. The snap ring 13 and elements associated therewith serve also to hold the parts as an assembled unit.

For those installations where a lubricant seal is not required, the parts may be held in assembly by deforming the outer cup or sleeve, as is illustrated in Figure 4, where a series of inwardly extending spring fingers or tongues 14 are provided. These fingers extend inwardly on a downwardly inclined angle and provide abutments for the outturned flange of the inner sleeve 15 after the sleeve has been moved past the abutments. Figure 4 also shows the inner sleeve provided at its lower end with a series of spring fingers 16 to provide a clutching engagement with the steering shaft to insure unisonal movement of the sleeve and shaft, and prevent rattle caused by liberal manufacturing limits.

I claim:

1. In a steering column assembly, an upper bearing unit between the steering column tube and the steering wheel shaft, comprising as a unitary sub-assembly, an outer sheet metal sleeve having an intermediate cylindrical portion to fit the interior surface of the steering column tube with an outturned end flange adapted to seat against the end of the tube and locate the parts and an inturned flange at its opposite end, an inner sheet metal sleeve having a cylindrical portion to fit the shaft and projecting partially inside the outer sleeve at the inturned end thereof and having an outturned flange at the enclosed end for cooperation with said inturned flange to retain anti-friction elements between the sleeves, an oil sealing ring bearing on the exterior surface of the inturned flange of the outer sleeve and surrounding the cylindrical portion of the inner sleeve beyond said inturned flange, and means to mount said ring on the inner sleeve and prevent axial separation of the sleeves, together with spring means bearing on the outturned flange of the inner sleeve and exerting constant yielding pressure in an axial direction upon the bearing surfaces.

2. In a steering column assembly, a sub-assembly bearing unit between the steering wheel shaft and its housing, including a pair of sleeves having cylindrical portions to fit the shaft and housing, respectively, in partially overlapping relation with lateral flanges at adjacent overlapping ends in overlapped relation to each other, a series of bearing elements retained between the overlapping portions of the sleeves by said flanges, an oil sealing ring mounted upon the cylindrical portion of one sleeve beyond the overlapping portions for wiping contact with the flange of the other sleeve, and spring means bearing on the other flange and urging under constant pressure the flanges toward each other.

3. In a steering column assembly, a bearing unit for the upper end of the hand wheel steering shaft including inner and outer sleeves, a pair of axially spaced radially extending retainer flanges on one of said sleeves, a retainer flange extending radially from the other sleeve into the space between the axially spaced flanges of the cooperating sleeve, an oil seal interposed between one side of the intermediate flange and one of said pair of flanges and an annular series of anti-friction bearing elements between the opposite side of the intermediately positioned flange and the other of said pair of flanges.

4. For use at the upper end of a steering column assembly between the housing and the hand wheel shaft, a bearing unit comprising an outer cylinder fitted interiorly of the housing with an outturned locating flange at one end engaged with the end of the housing and an inturned flange at the other end, an inner cylinder surrounding the shaft and having at one end an outturned flange cooperating with the inturned flange of the outer cylinder to retain bearing elements therebetween, and inwardly directed fingers at its opposite end adapted to clutch said shaft together with constant pressure exerting means yieldingly urging said bearing retainer flanges toward each other.

5. For use at the upper end of a steering column assembly between the housing and the hand wheel shaft, a bearing unit comprising an outer cylinder fitted interiorly of the housing with an outturned locating flange at one end engaged with the end of the housing and an inturned flange at the other end, an inner cylinder surrounding the shaft and having at one end an outturned flange cooperating with the inturned flange of the outer cylinder to retain bearing elements therebetween, together with constant pressure exerting means yieldingly urging said bearing retainer flanges toward each other.

6. For use at the upper end of a steering column assembly between the housing and the hand wheel shaft, a bearing unit comprising an outer cylinder fitted interiorly of the housing with an inturned flange at one end, an inner cylinder surrounding the shaft and having at one end an outturned flange cooperating with the inturned flange of the outer cylinder to retain bearing elements therebetween, and inwardly directed fingers at its opposite end adapted to clutch said shaft together with constant pressure exerting means yieldingly urging said bearing retainer flanges toward each other.

OLAF RASMUSSEN.